United States Patent
Kohler et al.

(10) Patent No.: US 6,618,499 B1
(45) Date of Patent: Sep. 9, 2003

(54) ITERATIVE GAMUT MAPPING

(75) Inventors: Timothy L. Kohler, San Jose, CA (US); Todd Newman, Palo Alto, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/323,266

(22) Filed: Jun. 1, 1999

(51) Int. Cl.⁷ .............................. H04N 1/46; G06K 9/00
(52) U.S. Cl. ...................................... 382/162; 358/518
(58) Field of Search ................................. 358/500, 504, 358/518, 522, 524, 530; 382/285, 286, 162, 166

(56) References Cited

U.S. PATENT DOCUMENTS

| | | | | |
|---|---|---|---|---|
| 5,594,557 | A | * | 1/1997 | Rolleston .................... 358/518 |
| 5,699,491 | A | | 12/1997 | Barzel ......................... 395/109 |
| 6,128,022 | A | * | 10/2000 | Dillinger .................... 345/431 |
| 6,437,792 | B1 | * | 8/2002 | Ito ............................. 345/600 |

OTHER PUBLICATIONS

Mukesh Prasad, "Intersection of Line Segments", *Graphics Gems II*, Academic Press, Inc., 1991, pp. 7–9.

Ján Morovic, et al., "Gamut Mapping Algorithms Based On Psychophysical Experiment", *The Fifth S&T/SID Color Imaging Conference: Color Science, Systems, and Applications*, Nov. 17–20, 1997, IS&T—The Society for Imaging Science and Technology, pp. 44–49.

Gustav J. Braun, et al., "Techniques for Gamut Surface Definition and Visualization", *The Fifth S&T/SID Color Imaging Conference: Color Science, Systems, and Applications*, Nov. 17–20, 1997, IS&T—The Society for Imaging Science and Technology, pp. 147–152.

* cited by examiner

*Primary Examiner*—Jerome Grant, II
(74) *Attorney, Agent, or Firm*—Fitzpatrick, Cella, Harper & Scinto

(57) ABSTRACT

A system for mapping an input point to a surface of a color gamut in a color space. A two-dimensional slice of the color space is selected. The two-dimensional slice includes the input point. A projection point in the two-dimensional slice and a projection between the input point and the projection point are determined. An intersection point between the projection and a mathematical approximation in the two-dimensional slice also is determined between points at least substantially on the surface of the color gamut. A new mathematical approximation is determined between points at least substantially on the surface of the color gamut, based on the intersection point. The intersection point is redetermined at an intersection between the projection and the new mathematical approximation. The determination of the new mathematical approximation and the redetermination of the intersection are repeated until the intersection point satisfies a goodness criteria.

155 Claims, 8 Drawing Sheets

| | $H_0$ | $H_1$ | $H_2$ | ... | H | | $H_n$ |
|---|---|---|---|---|---|---|---|
| $L_0$ | $C_{00}$ | $C_{10}$ | $C_{20}$ | ... | | | $C_{n0}$ |
| $L_1$ | $C_{01}$ | $C_{11}$ | $C_{21}$ | ... | | | $C_{n1}$ |
| $L_2$ | $C_{02}$ | $C_{12}$ | $C_{22}$ | ... | | | $C_{n2}$ |
| L | : | : | : | : ... | | | |
| $L_n$ | $C_{0n}$ | $C_{1n}$ | $C_{2n}$ | | | | $C_{nn}$ |

FIG. 5A

| $H_0$ | L | C |
|---|---|---|
| X: | $L_{0X}$ | $C_{0X}$ |
| Y: | $L_{0Y}$ | $C_{0Y}$ |
| Z: | $L_{0Z}$ | $C_{0Z}$ |

| $H_1$ | L | C |
|---|---|---|
| X: | $L_{1X}$ | $C_{1X}$ |
| Y: | $L_{1Y}$ | $C_{1Y}$ |
| Z: | $L_{1Z}$ | $C_{1Z}$ |

⋮

| $H_n$ | L | C |
|---|---|---|
| X: | $L_{nX}$ | $C_{nX}$ |
| Y: | $L_{nY}$ | $C_{nY}$ |
| Z: | $L_{nZ}$ | $C_{nZ}$ |

FIG. 5B

ITERATIVE GAMUT MAPPING

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The invention is directed to a system for determining a mapping of an input color to a surface of a color gamut. More particularly, the invention concerns performing such a mapping through iterative determinations of an intersection between a projection for mapping the input point with an approximation of the surface of the color gamut.

2. Description of the Related Art

Each different color output device is capable of color operation only in a particular range of colors, referred to as the color gamut of the device. It is common to find variations in color gamuts for different color devices, such as printers and monitors, both between the different types of devices and between different models of the devices from different manufacturers. Thus, a color printer may not be capable of printing colors displayed on a color monitor. In addition, a color input device, such as a color scanner, may be able to input colors that lie outside of the color gamut for a color monitor, a color printer, or both.

The color gamut for a color output device can be modelled in a multi-dimensional space, for example a color space having hue, chroma and lightness axes. The boundary surface of the color gamut in the color space represents a demarcation between colors that can be output by the device, and colors that cannot be output by the device. A given color can be modelled as one point in the color space.

In some cases, an input point representing a color lies inside of a volume enclosed by the surface of a first color gamut for a first device, but outside of a volume enclosed by a surface of a second color gamut for a second device. In those cases, the color can be output by the first device, but not by the second device. Conventionally, in order to output a color approximating the input point using the second device, the input point is mapped from the first color gamut to the second color gamut.

Several conventional techniques, such as the CARISMA technique, produce mappings that result in output colors which are visually satisfactory approximations of the out-of-gamut color represented by the input point. A necessary step in many of these techniques is to map the input point to the surface of the second color gamut.

According to one typical method of performing this mapping, the first and second color gamuts are modelled in a three dimensional space having hue, chroma, and lightness axes. A projection line is drawn from the input point to a predetermined point on the lightness axis. The predetermined point typically has the same hue as the input point and has lightness corresponding to lightness of a cusp of the surface of the second color gamut. Other predetermined points can be used for the projection line. Then, an intersection between the projection line and the surface of the second color gamut is determined, and this intersection is used as the mapping of the input point to the second color gamut.

The surface of the second color gamut typically is a collection of points that are determined experimentally. Thus, the surface is not represented by an equation or equations. As a result, numerical techniques are required for determining the intersection of the projection line with the surface.

Conventional numerical techniques involve searching a table which represents the surface of the second color gamut for a point that intersects the projection line. However, such searching operations can be unacceptably slow, involving numerous reading and comparison operations.

SUMMARY OF THE INVENTION

The present invention addresses the foregoing deficiency of conventional numerical methods by repeatedly estimating a point where a projection intersects an approximation of a surface of a color gamut. The estimations are performed by determining an approximation of the surface of the color gamut, and determining an intersection of the projection with the approximation. After each estimation, the approximation is updated based on the intersection. These estimations are repeated until the intersection satisfies a goodness criteria, such as when two successive estimations of the point vary by less than a predetermined small amount, or after a certain number of iterations where it can be expected that a next iteration will differ by an acceptable small amount.

It has been found that the foregoing technique rapidly arrives at a satisfactory estimation of the mapping of the input point to the surface of the color gamut. In particular, a satisfactory mapping has been found to occur in many cases with only two iterations of the estimation.

Accordingly, in one aspect, the present invention concerns a method for mapping an input point to a surface of a color gamut in a color space. According to the method, a selecting step selects a two-dimensional slice of the color space, the two-dimensional slice including the input point. A first determining step determines a projection point in the two-dimensional slice. Preferably, the projection point lies on a lightness axis of the surface, at a same hue as that of the input point, but it need not. A second determining step determines a projection which passes through the input point and the projection point. A third determining step determines an intersection point between the projection and a mathematical approximation in the two-dimensional slice between points that approximate the surface of the color gamut. A fourth determining step determines a new mathematical approximation between points at least substantially on the surface of the color gamut, wherein the new mathematical approximation is determined based on the intersection point. Next, a redetermining step redetermines the intersection point, wherein the intersection point is redetermined at an intersection between the projection and the new mathematical approximation. The fourth determining step and the redetermining step are repeated until the intersection point satisfies a goodness criteria.

By virtue of the foregoing iterative operation, an intersection which adequately maps the input point to the color gamut surface is efficiently determined.

In the preferred embodiment, the mathematical approximation in the third determining step extends between predetermined points at least substantially on the surface of the color gamut. The predetermined points preferably are stored in a table which is indexed by hue value.

This use of a table enhances the efficiency of the gamut mapping according to the invention. For example, in the case that the mathematical approximation is a straight-line segment, the mathematical approximation in the third determining step can be determined by a table look-up for endpoints of straight-line segments that approximate the color gamut for a given hue value. Then, the intersection of the projection with one of these straight-line segments can be determined by using well-known and very efficient mathematical techniques.

While the mathematical approximation preferably is one or more straight-line segments, the mathematical approximation can be one or more curves extending between points at least substantially on the surface of the color gamut.

Likewise, in the fourth determining step, the new mathematical approximation preferably is a straight-line segment extending between points at least substantially on the surface of the color gamut. The new mathematical approximation also can be a curve extending between points at least substantially on the surface of the color gamut. The shape of the mathematical approximation does not have to be the same in the third and the fourth determining steps.

In the preferred embodiment, the color space has hue, chroma, and lightness axes, and the two-dimensional slice is a slice of constant hue. The surface of the color gamut preferably is stored in a table indexed by hue and lightness values, and the table contains chroma values corresponding to hue and lightness values. Alternatively, the surface of the color gamut is stored in a table indexed by hue and chroma values, and the table contains lightness values corresponding to hue and chroma values.

The projection point preferably is a point on the lightness axis having lightness at least substantially equal to lightness of a cusp of the surface of the color gamut in the two-dimensional hue slice. This feature provides for a mapping used by many conventional techniques, for example the CARISMA technique, for outputting an out-of-gamut color with a color output device.

According to the preferred embodiment of the invention, a first one of the points determined in the fourth determining step for the new mathematical approximation has chroma at least substantially equal to chroma of the intersection point, and a second one of the points determined in the fourth determining step for the new mathematical approximation has lightness at least substantially equal to lightness of the intersection point. These two points can be easily and rapidly determined, thereby further enhancing the efficiency of the mapping.

The invention is particularly applicable to implementation of color standards, such as those that are being proposed for development to the International Color Consortium (ICC). In particular, the invention provides a rapid and efficient technique for gamut mapping that produces consistent results in accordance with such standards.

In other aspects, the invention concerns an apparatus for performing the foregoing gamut mapping, as well as computer-executable process steps and a memory medium storing such process steps for performing the gamut mapping.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 5A and 5B are representative views of tables which store a color gamut surface such as the one shown in FIG. 4A, including straight-line approximations for plural hue slices of the color gamut surface.

DETAILED DESCRIPTION OF THE PREFERRED EMBODIMENT

Figure 1:
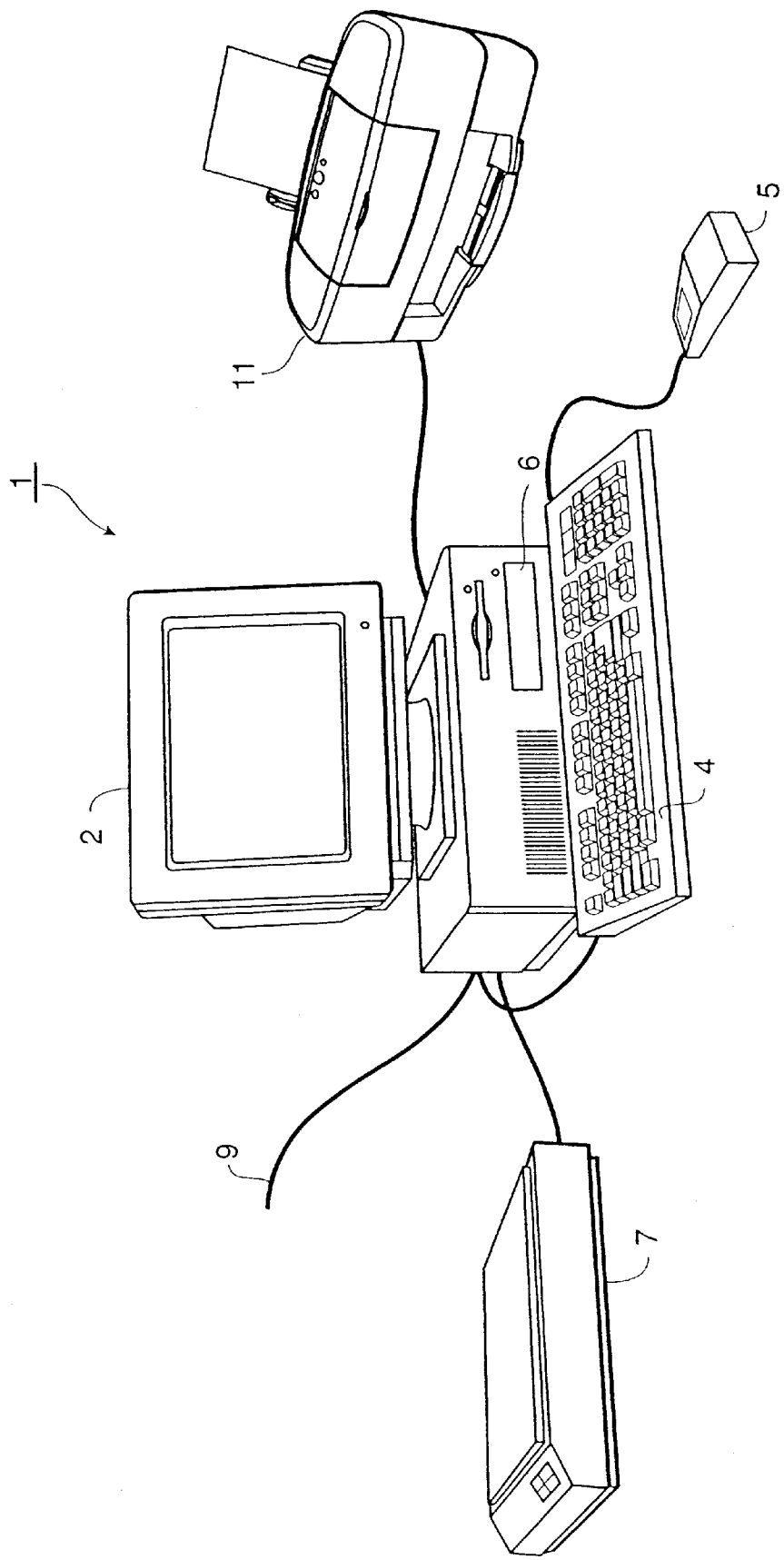
FIG. 1 is a representative view of a computer system in which iterative gamut mapping according to the invention may be implemented.

FIG. 1 is a representative view of a computer system in which iterative gamut mapping according to the invention may be implemented. Computer system 1 can be a Macintosh, PC-compatible, or other type of system having an operating system which preferably is a windowing operating system, such as Microsoft® Windows® NT®, but which also may be a non-windowing operation system, such as DOS or UNIX. In the preferred embodiment, computer system 1 is a Pentium®-based computer system.

Provided with computer system 1 are monitor 2 which may be a color monitor, keyboard 4 for entering user commands, and a pointing device such as mouse 5 for pointing to and for manipulating graphical user interfaces and other objects displayed on monitor 2.

Computer system 1 also includes a mass storage device such as fixed disk 6 for storing computer-executable process steps for application programs such as image processing applications, device drivers such as monitor, printer and scanner drivers, and the like. Such storage also may be provided by a CD-ROM (not shown).

Although computer system 1 is depicted as a programmable general-purpose computer, the present invention can be implemented using a dedicated computer terminal or other type of data processing equipment.

Scanner 7 is an image acquisition device that may be used to scan documents so as provide images to computer system 1. Of course, images may be provided to computer system 1 using other image acquisition devices, such as a digital camera or the like. Images also may be provided to computer system 1 from a variety of other sources, such as from a local area network or the World Wide Web through network interface 9.

Printer 11 is provided for outputting images. Images may be output from computer system 1 using other devices such as monitor 2. Images also may be output from computer system 1 to a variety of other destinations, such as to a local area network or the World Wide Web through network interface 9. At these other destinations, the images typically are output through devices such as printers or displays.

Devices used to output images can output colors that fall within color gamuts for those devices. These color gamuts differ between different devices, and in particular between different types of devices. For example, color printers typically have very different color gamuts than do color monitors. In addition, different types of color printers, such as ink jet and laser color printers, typically have very different color gamuts.

It has been proposed that the International Color Consortium (ICC) set forth color standards for color devices, including specifications for device descriptor parameters for various color devices. It should be possible to derive color gamuts for color devices from the device descriptor parameters for those devices.

Colors for images output by a system such as computer system 1 may fall within (i.e., inside the volume of) a color gamut for one image output device, but outside of a color gamut for another image output device. Images generated for output using one image output device often include colors outside of the color gamut for another image output device. For example, images generated for output using monitor 2 often include colors outside of the color gamut for printer 11.

In addition, image output devices typically cannot output all colors of a color image provided by a color input device such as scanner 7. Colors for an image input with a color input device often include colors that are outside of the color gamut for a color output device. For example, printer 11 typically cannot output all of the colors that scanner 7 can provide.

In order for an image output device to output an image that includes out-of-gamut colors, those colors must be mapped to colors that fall within the color gamut. In addition, in order to output images that look substantially the same using different image output devices with different color gamuts, it is often necessary to map a color from within a first color gamut to within a second color gamut.

Several conventional techniques exist for mapping an out-of-gamut input color to within a color gamut. The CARISMA technique is an example of such a technique. One step in these techniques typically is to map a point representing the out-of-gamut color to a surface of the color gamut. Another step typically is to map the point to a surface of a color gamut which includes the point. Iterative gamut mapping according to the invention provides an efficient system for performing such a mapping to a gamut surface, as described hereinbelow.

Figure 2:
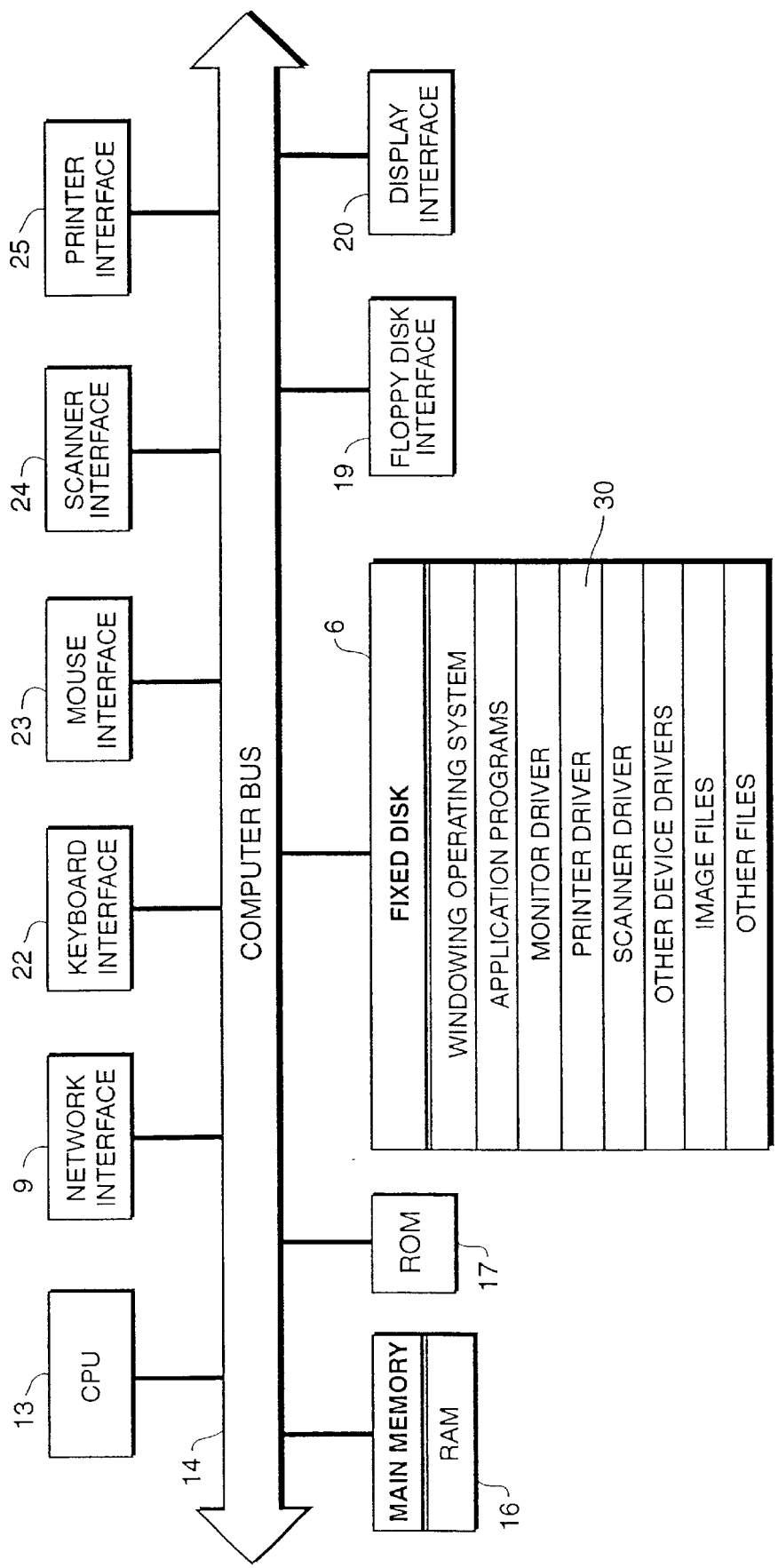
FIG. 2 is a detailed block diagram showing the internal architecture of the computer system shown in FIG. 1.

FIG. 2 is a detailed block diagram showing the internal architecture of computer system 1. As shown in FIG. 2, computer system 1 includes central processing unit (CPU) 13 which interfaces with computer bus 14. Also interfacing with computer bus 14 are fixed disk 6, network interface 9, main memory (RAM) 16, read only memory (ROM) 17, floppy disk interface 19, display interface 20 to monitor 2, keyboard interface 22 to keyboard 4, mouse interface 23 to mouse 5, scanner interface 24 to scanner 7, and printer interface 25 to printer 11.

Main memory 16 interfaces with computer bus 14 so as to provide RAM storage to CPU 13 during execution of software applications and device drivers. More specifically, CPU 13 loads process steps from fixed disk 6, another storage device, or some other source such as a network, into a region of main memory 16. CPU 13 then executes the stored process steps from main memory 16 in order to execute applications and device drivers. Data such as color images can be stored in main memory 16, where the data can be accessed by CPU 13 during execution of the process steps.

As also shown in FIG. 2, fixed disk 6 typically contains an operating system, application programs such as image processing applications, device drivers including monitor, printer and scanner drivers, image files, and other files. In this embodiment, iterative gamut mapping according to the invention is implemented in the device driver, here printer driver 30 for printer 11. However, iterative gamut mapping according to the invention can be embodied in other forms, such as a stand-alone application program, or as part of another application program. For example, iterative gamut mapping can be implemented in an image processing application so as to map colors from an input image to a desired output color gamut. This output color gamut could be determine based either on a destination output device or on a desired color effect. Likewise, device drivers can perform the gamut mapping so as to prepare an image for output by a particular image output device or so as to achieve a desired image transformation.

Figure 3:
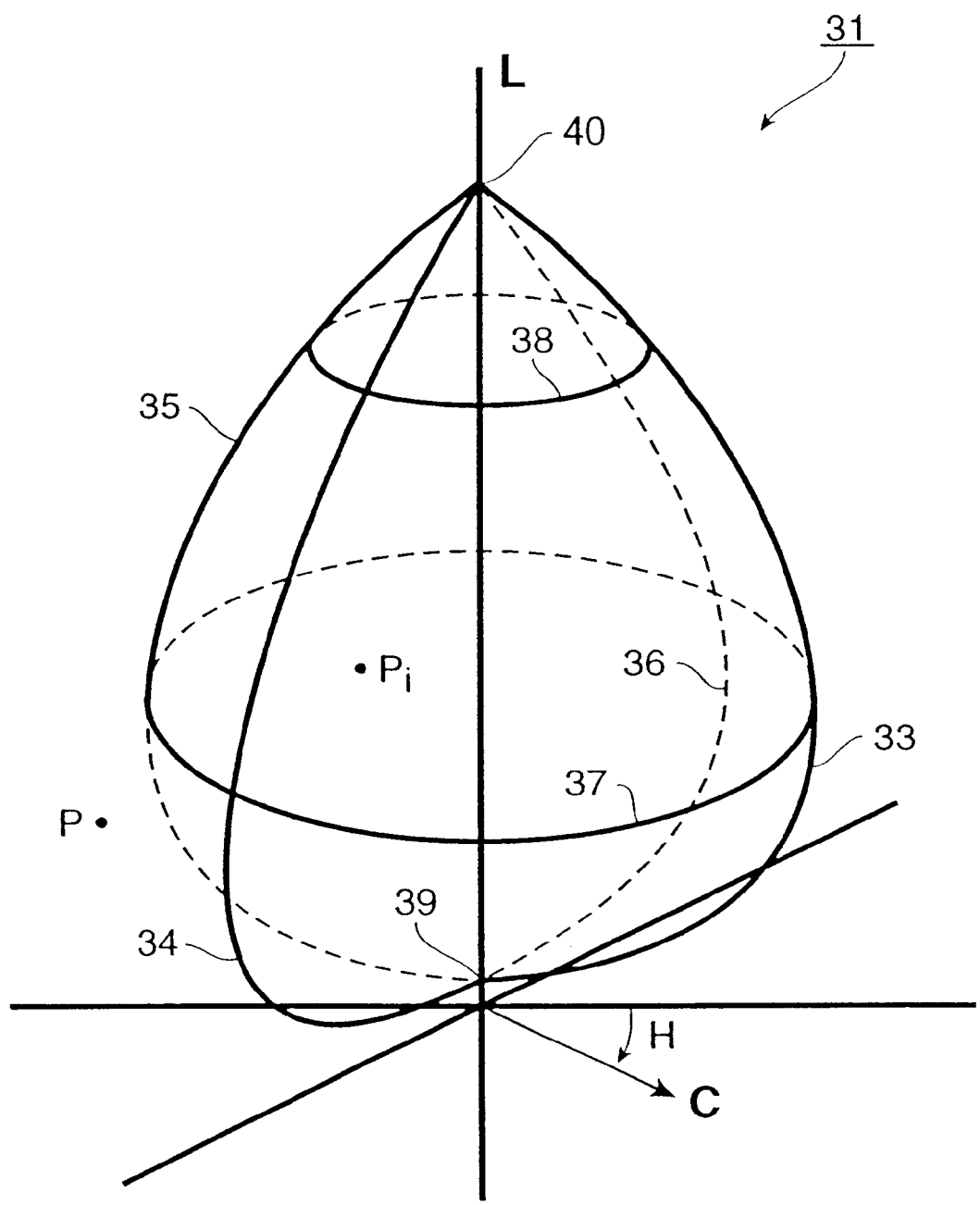
FIG. 3 is a representative view of a color gamut surface.

FIG. 3 is a representative view of a color gamut surface. Colors represented by points enclosed by the color gamut surface are within the color gamut and therefore can be input or output by the device corresponding to the color gamut.

Shown in FIG. 3 is color gamut surface 31 in three-dimensional HLC color space. This three-dimensional color space preferably is defined by the following cylindrical coordinates: L, a scalar lightness value; H, a hue value in degrees; and C, a scalar chroma value.

It should be noted that the invention can be implemented in other color spaces, although perceptual spaces such as the HLC color space are preferred. For example, the invention can be implemented in the CIECAM 97S appearance model, in which case the L scalar lightness value is replaced by a J scalar lightness value. Also, the color gamut surface need not be mapped in a cylindrical color space.

In FIG. 3, color gamut surface 31 is illustrated by lines running along the color gamut surface. Line 33 runs along color gamut surface 31 at a hue value of 0°; line 34 runs along color gamut surface 31 at a hue value of 90°; line 35 runs along color gamut surface 31 at a hue value of 180°; and line 36 runs along color gamut surface 31 at a hue value of 270°. Lines 37 and 38 run along color gamut surface 31 at constant lightness values.

On the lightness axis, points on the color gamut surface for a zero chroma value overlap at points 39 and 40. These points represent the black and white points, respectively, of the color gamut.

Color gamut surfaces typically are not symmetric. In fact, a color gamut surface typically includes at least some irregularly-shaped portions. Color gamut surface 31 in FIG. 3 therefore is shown as a non-symmetric surface. For example, the color gamut surface at line 33 for hue value 0° is differently-shaped then the color gamut surface at line 35 for hue value 180°.

Point $P_i$ in FIG. 3 is enclosed by color gamut surface 31. Thus, point $P_i$ lies within the volume of the color gamut, and a color represented by point $P_i$ can be output by the device corresponding to color gamut surface 31. In contrast, point P is not enclosed by color gamut surface 31, indicating that a color represented by point P cannot be output by that device.

A color gamut surface typically is derived based on experimental measurements of color capabilities of a device. As a result, no mathematical model typically exists for a color gamut surface. Instead, the color gamut surface typically is represented by a collection of color values in the color space for the color gamut.

Figure 4A:
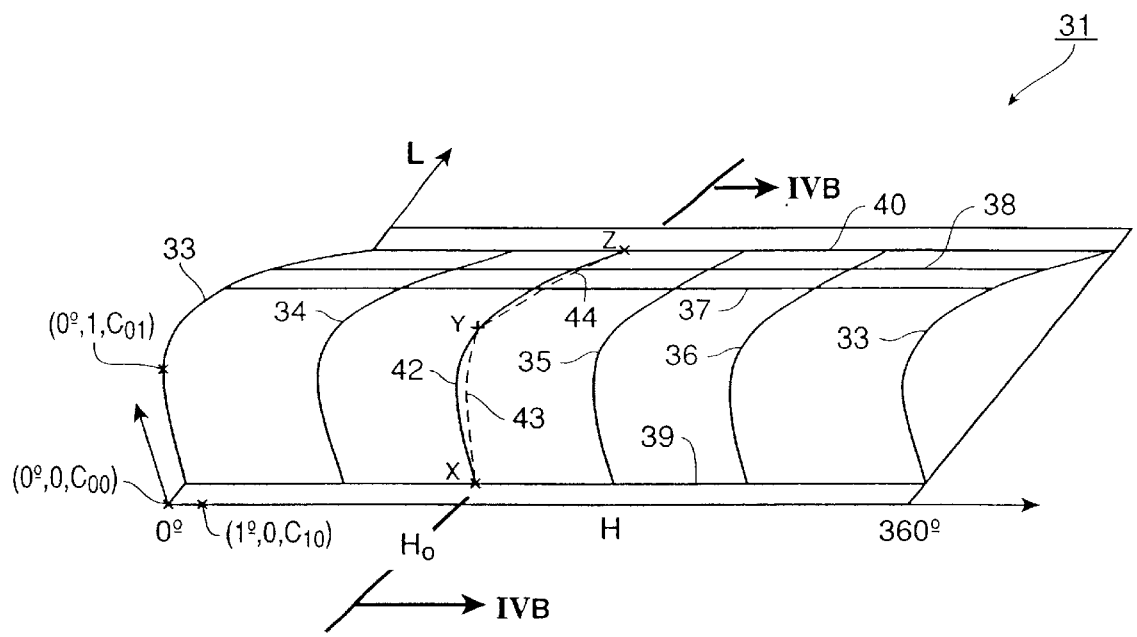
FIG. 4A is an alternative representation of the color gamut surface shown in FIG. 3, with the addition of a straight-line approximation of the color gamut surface for hue value $H_0$.

FIG. 4A is an alternative representation of color gamut surface 31 shown in FIG. 3, with the addition of a straight-line approximation of the color gamut surface for hue value $H_0$.

In FIG. 4A, hue and lightness values are arranged on two orthogonal axes. Chroma values corresponding to given hue and lightness values are represented as heights of surface 31 at those hue and lightness values.

Conceptually, FIG. 4A illustrates color gamut surface 31 shown in FIG. 3 "unrolled" about the lightness axis onto a flat hue-lightness plane. Lines 33 through 38 in FIG. 4A correspond to like-numbered lines in FIG. 3. For example, line 33 is at a hue value of 0° in both FIGS. 3 and 4A.

As a result of the unrolling of color gamut surface 31, lightness values for different hues of color gamut surface 31 at zero chroma value no longer overlap. Thus, points 39 and 40 in FIG. 3 are transformed into lines in FIG. 4A.

Also shown in FIG. 4A is an approximation of color gamut surface 31 for hue slice 42 of constant hue value $H_0$. This approximation comprises line segment 43 from point X to point Y, and line segment 44 from point Y to point Z. Iterative gamut mapping according to the invention utilizes such approximations, as explained in more detail below.

Figure 4B:
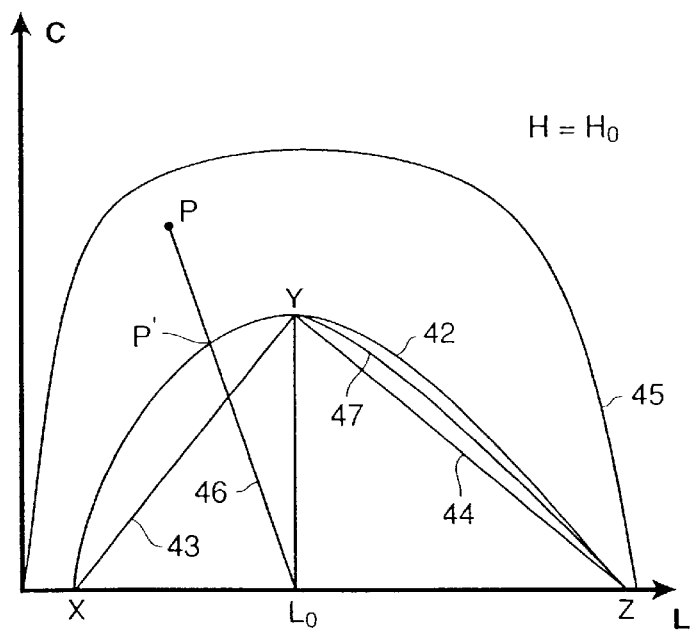
FIG. 4B is a representative view of a slice of constant hue of the color gamut surface shown in FIGS. 3 and 4A, including approximations of the color gamut surface according to the invention, along with a slice of constant hue of another color gamut surface.

FIG. 4B is a representative view of hue slice 42 of constant hue $H_0$ of color gamut surface 31, including line segments 43 and 44 which comprise an approximation of hue slice 42 according to the invention. Thus, FIG. 4B shows a section of FIG. 4A taken at line IVB—IVB.

Also shown in FIG. 4B is hue slice 45 at hue value $H_0$ for another color gamut surface. Hue slices 42 and 45 enclose different color values, representing different colors that can be processed by the devices corresponding to the hue slices.

In FIG. 4B, hue slices 42 and 45 are examples of slices of color gamut surfaces for printer 11 and monitor 2, respectively. Hue slice 45 encloses lightness and chroma values that are not enclosed by hue slice 42. This represents the ability of monitor 2 to display colors that cannot be printed by printer 11. For example, a color represented by point P can be displayed by monitor 2, as represented by point P lying within hue slice 45. However, that color cannot be printed by printer 11, as represented by point P lying outside of hue slice 42.

In order for printer 11 to print an image which includes a color represented by point P, that color should be mapped to a point enclosed by hue slice 42 of color gamut surface 31 in such a way that a resulting color is a visually satisfactory approximation of the out-of-gamut color. Techniques for performing such a mapping, such as the CARISMA technique, typically start by mapping the out-of-gamut point to the surface of the color gamut.

In order to map the point to a color gamut surface, a projection point $L_0$ often is selected on the lightness axis. Projection point $L_0$ preferably has a lightness value equal to the lightness value of the cusp, or point of maximum chroma value, in $H_0$ hue slice 42 of color gamut surface 31 to which point P is being mapped. Projection 46 is determined between point P and projection point $L_0$. Projection 46 typically is a line. Intersection point P' between projection 46 and hue slice 42 of color gamut surface 31 is determined. Intersection point P' is the mapping of point P to hue slice 42, and therefore to color gamut surface 31.

Iterative gamut mapping according to the invention provides a new way of achieving the foregoing mapping of a point representing a color to a color gamut surface. In addition, iterative gamut mapping according to the invention can be used to perform other types of gamut mapping.

Figure 4C:
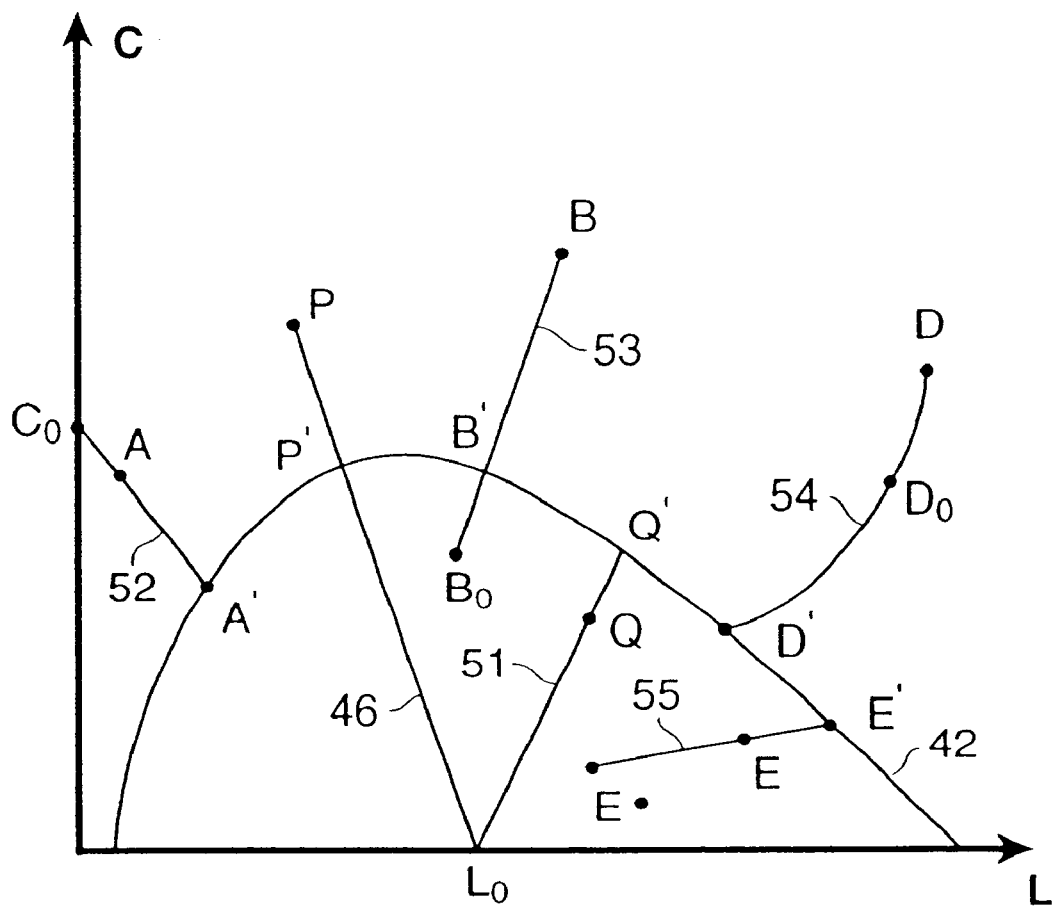
FIG. 4C is a representative view of various mappings to a surface of a color gamut that may be performed through iterative gamut mapping according to the invention.

FIG. 4C is a representative view of various mappings to a surface of a color gamut that may be performed through iterative gamut mapping according to the invention. Point Q enclosed by hue slice 42 of color gamut surface 31 is mapped to point Q' on the color gamut surface along projection 51 to projection point $L_0$. This mapping also is often used by color mapping techniques such as the CARISMA method.

The projection point can lie on an axis other than the lightness axis. Thus, point A is mapped along projection 52 to point $C_0$ on the chroma axis. The projection point also need not lie on an axis. Thus, point B outside of the color gamut is mapped to point B' along projection 53 to projection point $B_0$. The projection can be a curve, such as projection 54 through point $D_0$ for mapping point D to point D'. As another example, point E is mapped to point E' along projection 55 through point $E_0$.

Other possible mappings of an input point to a color gamut surface can be implemented using iterative gamut mapping according to the invention. The gamut need not be in an HLC color space. In addition, iterative mapping according to the invention can be used in other circumstances wherein a point needs to be mapped to a surface that is defined by a collection of points. The surface and the input point do not have to be in a color space. As long as the projection for mapping the point to the gamut surface intersects the gamut surface, iterative gamut mapping according to the invention can be utilized.

As noted earlier, color gamut surfaces typically are not represented by mathematical equations. Instead, the color gamut surfaces are represented by collections of experimentally-determined points. These points can be approximated with mathematical approximations. For example, line segments 43 and 44 approximate hue slice 42. The invention uses such mathematical approximations in order to determine the intersection between a projection and a hue slice of a color gamut surface, as explained in more detail below with reference to FIGS. 6 and 7A to 7C.

The approximations utilized by the invention do not have to comprise straight-line segments. Hyperbolic curves or other types of curves such as curve 47 can be used to approximate the hue slice of the color gamut. In addition, the approximations can comprise more than two lines or curves. The endpoints of the lines or curves preferably are selected so that the approximations do not cross over the hue slice of the color gamut surface. In the preferred embodiment, the approximations are of such a type that intersections between a projection such as projection 46 and the approximations can be determined easily and rapidly.

FIGS. 5A and 5B are representative views of tables which store a color gamut surface such as the one shown in FIG. 4A, including straight-line approximations for plural hue slices of the color gamut surface, respectively. These tables preferably are stored in fixed disk 6, either within the driver or application that performs the gamut mapping according to the invention or in a separate file. The tables preferably are read from fixed disk 6 before gamut mapping begins and are stored in main memory 16 during gamut mapping for rapid access.

Table 61 is a two-dimensional table with indices of hue and lightness values. For a given hue and lightness value combination, table 61 includes a chroma value entry. Of course, table 61 is of finite size. Accordingly, hue and lightness index values are not provided for every possible hue and lightness value.

For example, in one representative embodiment, table 61 includes entries at every one degree of hue and for lightness values between 0 and 255. Thus, chroma value $C_{00}$ corresponds to hue value $H_0=0°$ and lightness value $L_0=0$, representing a color with color values $(H=0°, L=0, C=C_{00})$. This point is illustrated at the lower left corner of color gamut 31 shown in FIG. 4A. Likewise, chroma value $C_{10}$ corresponds to a color with hue value $H_1=1°$ and lightness values $L_0=0$, representing a color with color values $(H=1°, L=0, C=C_{10})$. In FIG. 4A, this point is to the right of the point for color values $(H=0°, L=0, C=C_{00})$. The point representing color values $(H=0°, L=1, C=C_{01})$ is in the direction of increasing lightness from $(H=0°, L=0, C=C_{00})$ in FIG. 4A. The remaining entries correspond to points of increasing hue and lightness, as will be evident to those skilled in the art.

For hue and lightness values which fall between included indices, either adjacent hue and lightness index values can be used to look up a corresponding chroma value, or any of several well-know interpolation techniques can be utilized to determine a chroma value from neighboring hue and lightness values. During iterative gamut mapping according to the invention, adjacent index values preferably are used, as explained in more detail below with reference to FIGS. 6 and 7A to 7C.

It should be noted that tables with other arrangements than that of table 61 can be utilized with the invention. For example, the table could use chroma values as an index and have lightness value entries. Alternatively, a more conventional three-dimensional table with hue, lightness and chroma index values can be utilized, wherein the table entries are 1 for a color within a color gamut and are 0 for colors outside of the color gamut.

FIG. 5B shows table 62, which includes entries for straight-line approximations of a color gamut surface for various constant-hue slices. Preferably, table 62 includes entries corresponding to each of the hue indices in table 61. Thus, $H_0$ in table 62 preferably corresponds to $H_0$ in table 61, $H_1$ in table 62 preferably corresponds to $H_1$ in table 61, etc.

For each hue value, table 62 includes entries for three points X, Y and Z. Each of these points is defined by a pair of lightness and chroma values. Thus, for $H=H_0$, $X=(L_{0X}, C_{0X})$, $Y=(L_{0Y}, C_{0Y})$, and $Z=(L_{0Z}, C_{0Z})$; for $H=H_1$, $X=(L_{1X}, C_{1X})$, $Y=(L_{1Y}, C_{1Y})$, and $Z=(L_{1Z}, C_{1Z})$; etc.

For example, with reference to FIG. 4B, if $H_0=H_{17}$, then X shown in FIG. 4B is at $(L_{17X}, C_{17X})$, Y is at $(L_{17Y}, C_{17Y})$, and Z is at $(L_{17Z}, C_{17Z})$, with the lightness and chroma values read from table 62. Accordingly, once a hue value is determined for a hue slice of a color gamut, such as hue value $H_0$ for hue slice 42 of color gamut 31, then X, Y and Z for approximating the hue slice at that hue value can be determined through a simple and fast table look-up operation.

If the approximations of hue slices of the color gamut do not comprise straight-line segments, then other values can be included in table 62. For example, in the case that the approximations comprise curves, both endpoint values for the curves and curvature values representing the degree of curvature of those curves can be included in table 62 for each hue index.

Figure 6:
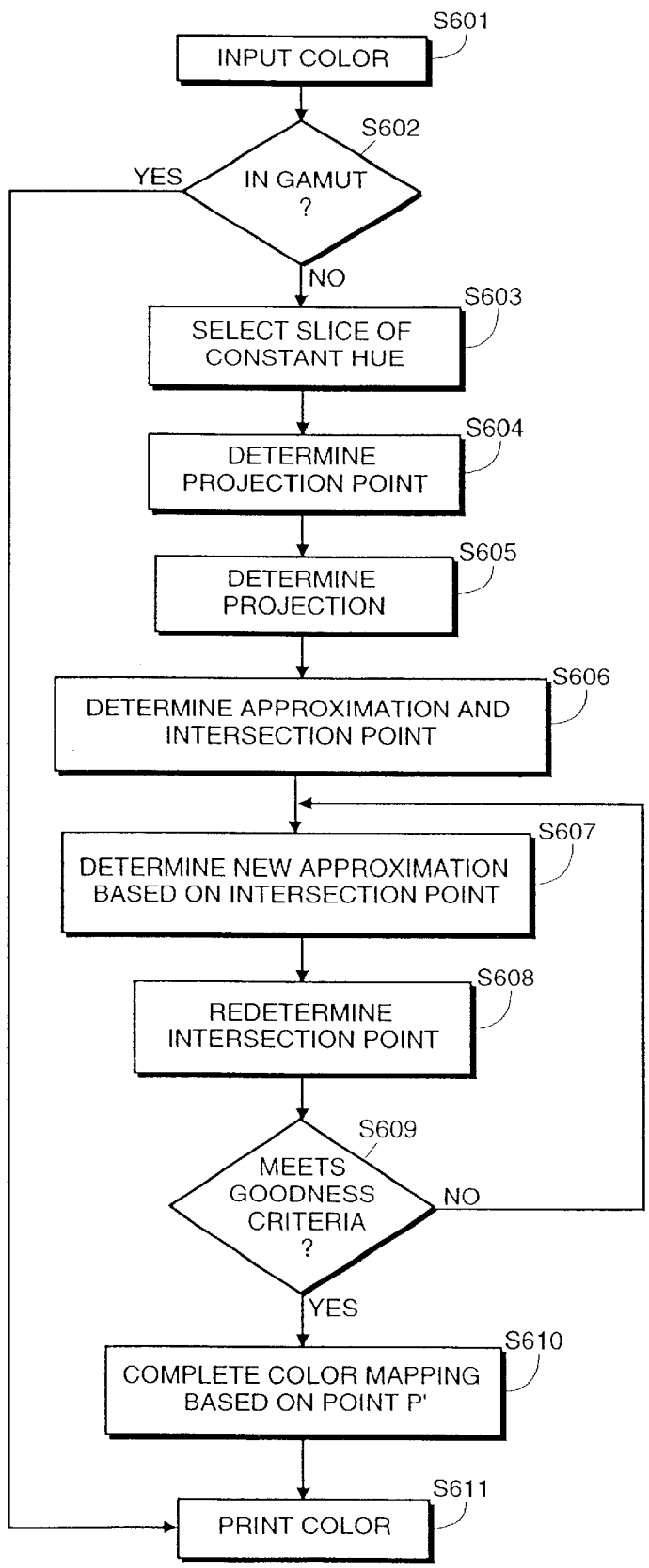
FIG. 6 is a flow chart for explaining iterative gamut mapping according to the invention.
Figure 7A:
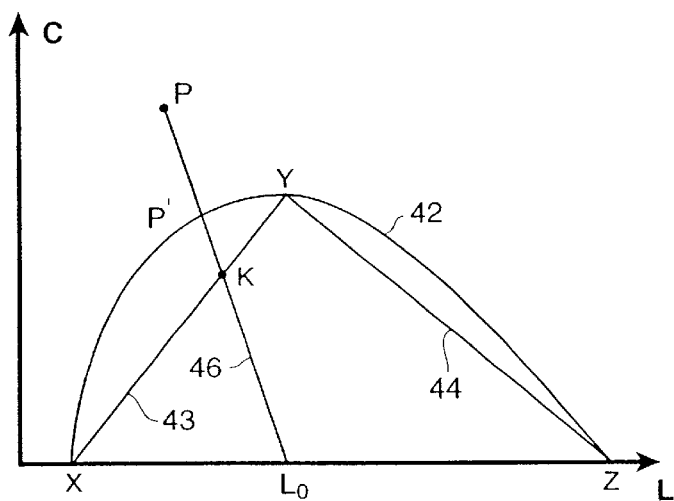
FIGS. 7A to 7C are representative views for explaining iterative gamut mapping according to the invention.
Figure 7B:
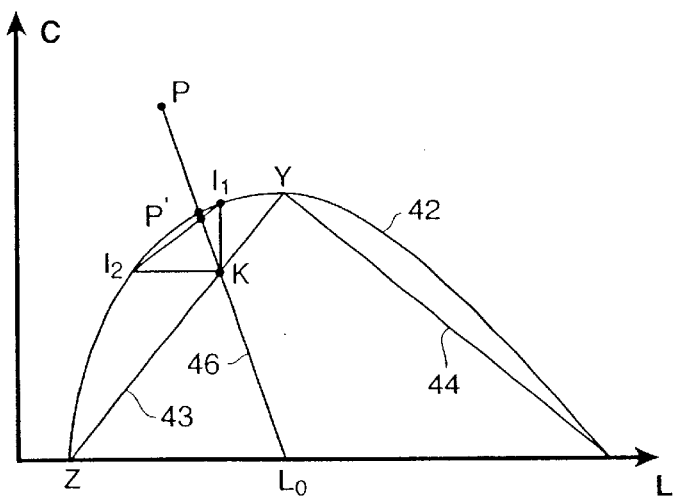
Figure 7C:
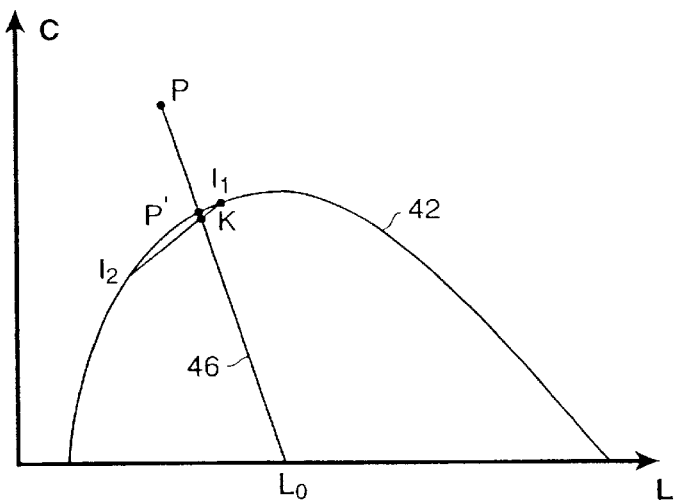

FIG. 6 is a flow chart for describing iterative gamut mapping according to the invention. FIGS. 7A to 7C are representative views for illustrating various phases of the iterative gamut mapping.

Briefly, according to the invention, an input point is mapped to a surface of a color gamut in a color space. In order to map the input point, a two-dimensional slice of the color space is selected. The two-dimensional slice includes the input point. A projection is determined for mapping the input point to the surface of the color gamut. A point where the projection intersects the surface of the color gamut is repeatedly estimated by repeatedly performing the steps of determining an approximation of the surface of the color gamut, and determining an intersection of the projection with the approximation. After each estimation, the approximation is updated based on the intersection.

In more detail, in step S601, a color is input to a gamut mapping system according to the invention, for example printer driver 30 running on computer system 1. In step S602, the system determines if the input color is within the color gamut for a target device, for example color gamut 31 for printer 11.

If the input color is within the color gamut, then flow proceeds to step S611, where the color is processed by the target device. In the case that the target device is a printer such as printer 11, then the printer prints the color.

If the color is not within the color gamut, flow proceeds to step S603, where a slice of constant hue is selected from the color gamut surface. The hue value of the slice preferably is substantially equal to the hue value for the input point. If the hue value of the input point does not correspond to a hue index of tables 61 and 62 for the color gamut surface, then a closest hue value index preferably is used as the hue value for the hue slice and the out-of-gamut point.

FIG. 7A illustrates a hue slice with hue value $H_0$ substantially equal to a hue value of out-of-gamut input point P, along with the out-of-gamut point.

Returning to FIG. 6, projection point $L_0$ for mapping point P to color gamut surface 42 is determined in step S604. In the preferred embodiment, projection point $L_0$ is selected at a lightness value equal to lightness at a point of maximum chroma of hue slice 42. However, the invention is equally applicable to different mappings based on different projection points, which need not lie on the lightness axis.

In step S605, projection 46 is determined. The projection preferably is a line which passes through input point P and projection point $L_0$. However, the projection can have another shape such as a curve. Intersection point P' of projection 46 with hue slice 42 of color gamut surface 31 is the mapping of input point P to color gamut surface 31. Projection 46 and intersection point P' are also shown in FIG. 7A.

Intersection point K between projection 46 and an approximation of hue slice 42 is determined in step S606. First, an approximation of hue slice 42 preferably is determined by looking up the hue value for the hue slice, namely $H_0$, in table 62. For example, the hue value of hue slice 42 is used to look up lightness and chroma values for endpoints X, Y and Z of line segments 43 and 44. Alternatively, different line segments or curves can be provided by a different table for approximating hue slices, such as three curves for a given hue slice.

Second, after the approximation is acquired, intersection point K of projection 46 with the approximation is determined. In the preferred embodiment, the approximation comprises plural line segments. Thus, intersection point K is found by determining which of the line segments intersects projection 46, and then determining the intersection of projection 46 with that line segment.

Because the intersection between the projection and the approximation of the hue slice is the intersection between two shapes that have mathematical representations, intersection point K can be rapidly calculated using simple mathematical techniques.

FIG. 7A shows an approximation to hue slice 42 of color gamut surface 31, namely line segments 43 and 44, along with intersection point K between projection 46 and line segment 43. In the embodiment illustrated in FIG. 7A, projection 46 is a line. Because the endpoints of projection 46 and line segment 43 are known, intersection point K can be found using well-known and efficient algorithms such as CheckIntersect shown in the Appendix to this specification.

Again returning to FIG. 6, a new approximation of a portion of hue slice 42 of color gamut surface 31 is determined in step S607. The approximated portion of hue slice 42 preferably includes intersection point P'. The new approximation to this portion preferably is a single line segment running between points determined based on intersection point K. However, the new approximation need not be a line segment and need not have a same type of shape as the approximation acquired in step S606.

In the preferred embodiment, the new approximation is line segment $I_1I_2$, wherein first point $I_1$ and second point $I_2$ lie at least substantially on hue slice 42. First point $I_1$ has a lightness value substantially equal to lightness value $L_K$ of intersection point K, and second point $I_2$ has a chroma value substantially equal to chroma value $C_K$ of intersection point K. Points $I_1$ and $I_2$, along with line segment $I_1I_2$, are illustrated in FIG. 7B.

In order to determine first point $I_1$, lightness value $L_K$ preferably is used to look up a chroma value in table 61. The hue value used to look up the chroma value is hue value $H_0$ for hue slice 42.

If lightness value $L_K$ does not correspond to an index value in table 61, then a lightness value is selected from the lightness values of the two indices that are adjacent to and that bracket lightness value $L_K$. For example, if table 61 has lightness index values of {0, 5, 10, ... , 70, 75, 80, 85, ... , 100}, and lightness value $L_K$ is 78.5, then one of lightness values 75 and 80 is selected.

Of the two lightness values, the one that preferably is selected is the lightness value that results in a point $I_1$ further from intersection point P'. This selection of a lightness value provides the greatest bracketing of intersection point P', thereby ensuring that line segment $I_1I_2$ has endpoints on both sides of intersection point P'.

In order to determine which of the lightness values is further from intersection point P', the slope of the current approximation to hue slice 42 of color gamut 31 preferably is determined. If the slope is positive, greater lightness values correspond to points on hue slice 42 further from intersection point P'. If the slope is negative, lesser lightness values correspond to points on hue slice 42 further from intersection point P'. For example, line segment 43 has a positive slope in FIG. 7B, and a point adjacent and to the right of point $I_1$ on hue slice 42 has a greater lightness value and is further from intersection point P' than a point adjacent and to the left of point $I_1$ on hue slice 42.

The slope of the current approximation can be determined either directly or by assuming that the slope is positive to the left of the cusp of the color gamut surface and negative to the right of the cusp of the color gamut surface. For example, in FIG. 7B, line segment 43 is to the left of the cusp at point Y of color gamut surface 42. Accordingly, the slope of line segment 43 is positive. Likewise, line segment 44 is to the right of the cusp at point Y of color gamut surface 42, and the slope of line segment 44 is negative.

Furthermore, because intersection point K is on the current approximation, it is possible to determine whether the approximation is to the left or to the right of point Y preferably by comparing lightness value $L_K$ of intersection point K with lightness value $L_Y$ of point Y. Therefore, if $L_K<L_Y$, then the current straight-line approximation is to the left of point Y, and the slope of the current approximation preferably is assumed to be positive. If $L_K>L_Y$, then the current straight-line approximation is to the right of point Y, and the slope of the current approximation preferably is assumed to be negative.

Once the slope is determined, the appropriate one of the lightness values indices that bracket $L_K$ is selected. If the slope is positive, the lesser one of the indices is selected. If the slope is negative, the greater one of the indices is chosen. For example, in FIG. 7B, if lightness value $L_K$ does not correspond to an index of table 61, then a next greater lightness index value adjacent to lightness value $L_K$ is determined to be the lightness value for point $I_1$.

Once a lightness value for $I_1$ has been determined, that lightness value is used to look up a chroma value in table 61. The lightness and chroma values identify point $I_1$ for the approximation $I_1I_2$ to color gamut surface 42.

In order to determine second point $I_2$ for the new approximation, a search of table 61 preferably is performed. If point K lies to the left of the cusp of hue slice 42, then the search proceeds in a direction of decreasing lightness values. If point K lies to the right of the cusp of hue slice 42, then the search proceeds in a direction of increasing lightness values. For example, in FIG. 7B, point K lies to the left of the cusp of hue slice 42 at point Y, so the search for point $I_2$ in table 61 proceeds in a direction of decreasing lightness values.

In order to perform the search, a lightness index value in table 61 adjacent to and in the proper direction from $L_K$ is determined. For example, if lightness value $L_K$ is 78.5, $L_K$ is greater than $L_Y$, and table 61 has lightness index values of {0, 5, 10, ... , 70, 75, 80, 85, ... , 100}, then the search begins at lightness index value 75 and proceeds in a direction of decreasing lightness index values.

The chroma is determined which corresponds to the determined lightness value. The chroma value is determined through a look-up operation in table 61. If the resulting chroma value is greater than chroma value $C_K$ of intersection point K, then a next lightness index value in the proper direction is determined. In the numeric example given above for a search starting at lightness value 75 and proceeding in a direction of decreasing lightness values, this next lightness index value is 70.

The process of looking up a chroma value and increasing or decreasing the lightness index value, as appropriate, is repeated until the chroma value corresponding to the lightness index value in table 61 is less than chroma value $C_K$. This lightness index value and the corresponding chroma value identify point $I_2$ for new approximation $I_1I_2$ to color gamut surface 42.

Returning to FIG. 6, intersection point K is redetermined in step S608 as the intersection between the new approximation and projection 46. A redetermined intersection point K is illustrated in FIG. 7C at the intersection between projection 46 and new approximation $I_1I_2$.

In step S609, it is determined if the redetermined intersection point K meets a "goodness" criteria for mapping point P to point P'. If the goodness criteria is met, redetermined point K is used as point P'. If the goodness criteria is not met, flow returns to steps S607 and S608 for determination of a new approximation and redetermination of a new intersection point K.

In the preferred embodiment, the goodness criteria is that redetermined point K varies less than a predetermined small amount from a previously-determined point K.

Alternatively, the goodness criteria can be performance of a predetermined number of successive iterations of steps S607 through S609. It has been found that two iterations provide an acceptable gamut mapping in most cases.

In step S610, a conventional technique such as the CARISMA technique completes the mapping of the out-of-gamut point to within the color gamut on the basis of point P'. Then, the color is printed in step S611. Alternatively, step S610 can be skipped and the color represented by point P' can be printed in step S611.

The Appendix appended hereto provides sample C source code for one representative embodiment of iterative gamut mapping according to the invention.

While the invention is described above with respect to what is currently considered its preferred embodiments, it is to be understood that the invention is not limited to that described above. In particular, while the invention is described in the context of techniques such as the CARISMA technique for mapping a color from outside of a color gamut to within the color gamut, the invention is equally applicable to any situation wherein a point is mapped to a gamut surface. Accordingly, the invention is intended to cover various modifications and equivalent arrangements included within the spirit and scope of the appended claims.

APPENDIX gamutTest.h

```
/* Copyright © 1999 Canon Information Systems, Inc.
*
* THE COPYRIGHT OWNER HAS NO OBJECTION TO THE
* FACSIMILE REPRODUCTION BY ANYONE OF THE PATENT
* DOCUMENT OR THE PATENT DISCLOSURE, AS IT APPEARS
* IN THE PATENT AND TRADEMARK OFFICE PATENT FILE OR
* RECORDS, BUT OTHERWISE RESERVES ALL COPYRIGHT
* RIGHTS WHATSOEVER.
*
* THIS SOFTWARE IS PROVIDED "AS=IS" WITHOUT
* WARRANTY OF ANY KIND, EXPRESS, IMPLIED, OR
* OTHERWISE, INCLUDING WITHOUT LIMITATION, ANY
* WARRANTY OF MERCHANTABILITY OR FITNESS FOR A
* PARTICULAR PURPOSE. IN NO EVENT SHALL CANON
* INFORMATION SYSTEMS, INC. BE LIABLE FOR ANY
* SPECIAL, INCIDENTAL, INDIRECT OR CONSEQUENTIAL
* DAMAGES OF ANY KIND, OR ANY DAMAGES WHATSOEVER
* RESULTING FROM LOSS OF USE, DATA OR PROFITS,
* WHETHER OR NOT ADVISED OF THE POSSIBILITY OF
* DAMAGE, AND ON ANY THEORY OF LIABILITY, ARISING
* OUT OF OR IN CONNECTION WITH THE USE OR
* PERFORMANCE OF THIS SOFTWARE
*/
#define MAX_LIGHTNESS_LEVELS  101
#define MAX_HUE_ANGLES        361   /* one more than
                                     /* degrees in a
                                     /* circle
#define MAX_PRIMARIES         6
#define MAX_SEGMENTS          10
#define DONT_INTERSECT        0
#define DO_INTERSECT          1
#define COLINEAR              2
#define MAP_INDEX( gamutmap, lightness, hue ) (
lightness > 0 ? (gamutmap.map + ( (lightness – 1) *
gamutmap.hueSlices) + hue): gamutmap.map + hue)
typedef struct
{
    double x;
    double y;
} Point;
typedef struct
{
    Point A;
    Point B;
} Line;
typedef struct
```

APPENDIX-continued

```
{
    int    count;
    Point  pts[MAX_SEGMENTS];
} Piece;
typedef enum
{
    ICCPrimaryRed, /* we may add more colors later
    ICCPrimaryYellow,
    ICCPrimaryGreen,
    ICCPrimaryCyan,
    ICCPrimaryBlue,
    ICCPrimaryMagenta
} ICCPrimeName;    /* this should eventually go in
                   /* icctypes.h
typedef struct
{
    ICCPrimaryName color;
    double         angle; /* hue angle in JCh
    int            index; /* index into map[ ] [hue]
} Primary;
typedef struct
{
    int isRegular    /* 1 = regular hue spacing; 0 =
                     /* must use primary table
    int LightnessLevels;
    int hueSlices;   /* You MUST allocate an
                     /* appropriate chunk based on
                     /* lightnessLevels and hueSlices.
                     /* Use MAP_INDEX macro to access
                     /* map array
    Piece pc[MAX_HUE_ANGLES];
    /* This table is only used if isRegular = 0 */
    int numPrimaries; /* Currently, max = 6
    Primary primaries [MAX_PRIMARIES];
} GamutMap;
int CheckIntersect( Line line1, Line line2, Point
*point);
int CheckSigns( double a, double b );
int NewMapAllocate (GamutMap gamutmap);
gamutTest.c /* Copyright © 1999 Canon Information Systems, Inc.
*
* THE COPYRIGHT OWNER HAS NO OBJECTION TO THE
* FACSIMILE REPRODUCTION BY ANYONE OF THE PATENT
* DOCUMENT OR THE PATENT DISCLOSURE, AS IT APPEARS
* IN THE PATENT AND TRADEMARK OFFICE PATENT FILE OR
* RECORDS, BUT OTHERWISE RESERVES ALL COPYRIGHT
* RIGHTS WHATSOEVER.
*
* THIS SOFTWARE IS PROVIDED "AS=IS" WITHOUT
* WARRANTY OF ANY KIND, EXPRESS, IMPLIED, OR
* OTHERWISE, INCLUDING WITHOUT LIMITATION, ANY
* WARRANTY OF MERCHANTABILITY OR FITNESS FOR A
* PARTICULAR PURPOSE. IN NO EVENT SHALL CANON
* INFORMATION SYSTEMS, INC. BE LIABLE FOR ANY
* SPECIAL, INCIDENTAL, INDIRECT OR CONSEQUENTIAL
* DAMAGES OF ANY KIND, OR ANY DAMAGES WHATSOEVER
* RESULTING FROM LOSS OF USE, DATA OR PROFITS,
* WHETHER OR NOT ADVISED OF THE POSSIBILITY OF
* DAMAGE, AND ON ANY THEORY OF LIABILITY, ARISING
* OUT OF OR IN CONNECTION WITH THE USE OR
* PERFORMANCE OF THIS SOFTWARE
*/
#include <stdio.h>
#include <math.h>
#include <malloc.h>
#include "gamutTest.h"
int main(int argc, char * argv[ ])
{
    int i,j;
    Point cuspPoint;
    Point samplePoint;
    Line sampleToCuspLine;
    Line currentPieceLine;
    GamutMap bigGamut;
    GamutMap smGamut;
    Point point;
    Point oldPoint;
```

APPENDIX-continued

```
/*
    if (argc != 2)
    {
        fprintf(stderr,"usage: %s
gmap_file\n",argv[0]);
        return (-1);
    }
*/
    // fill bigGamut and smGamut
    bigGamut.lightnessLevels = 101;
    smGamut.lightnessLevels = 101;
    bigGamut.hueSlices = 361;
    smGamut.hueSlices = 361;
    bigGamut.map = malloc (bigGamut.lightnessLevels
* bigGamut.hueSlices * sizeof(double));
    if (bigGamut.map == NULL) return (-1);
    smGamut.map = malloc (smGamut.lightnessLevels *
smGamut.hueSlices * sizeof(double));
    if (smGamut.map == NULL) return (-1);
// if ( !NewMapAllocate (bigGamut) ) return (-1);
// if ( !NewMapAllocate (smGamut) ) return (-1);
    for (i = 0; 1 < 101; i++)
    {
        for (j = 0; j < 361; j++)
        {
            *MAP_INDEX( bigGamut, i, j) =
(double) ((-((i - 50.0) * (i - 50.0))/25.0) + 100.0
);
            *MAP_INDEX( smGamut, i, j) =
(double) ((-((i - 70.0) * (i - 70.0))/15.0) + 80.0);
            if (*MAP_INDEX( bigGamut, i, j) < 0)
*MAP_INDEX( bigGamut, i, j) = 0;
            if (*MAP_INDEX( smGamut, i, j) < 0)
*MAP_INDEX( smGamut, i, j) = 0;
//          fprintf(stdout, "%d\t%d\t%lf\t",i, j,
*MAP_INDEX( bigGamut, i, j));
//          fprintf(stdout, "%d\t%d\t%lf\n",i, j,
*MAP_INDEX( smGamut, i, j));
        }
    }
// Fill piecewise table
    for (j = 0; j < 361; j++)
    {
        bigGamut.pc[j].count = 3;
        bigGamut.pc[j].pts[0].x = 0.0;
        bigGamut.pc[j].pts[0].y = 0.0;
        bigGamut.pc[j].pts[1].x = 50.0;
        bigGamut.pc[j].pts[1].y = 100.0;
        bigGamut.pc[j].pts[2].x = 100.0;
        bigGamut.pc[j].pts[2].y = 0.0;
        smGamut.pc[j].count = 7;
        smGamut.pc[j].pts[0].x = 35.0;
        smGamut.pc[j].pts[0].y = 0.0;
        smGamut.pc[j].pts[1].x = 48.0;
        smGamut.pc[j].pts[1].y = 47.0;
        smGamut.pc[j].pts[2].x = 64.0;
        smGamut.pc[j].pts[2].y = 77.0;
        smGamut.pc[j].pts[3].x = 70.0;
        smGamut.pc[j].pts[3].y = 80.0;
        smGamut.pc[j].pts[4].x = 76.0;
        smGamut.pc[j].pts[4].y = 77.0;
        smGamut.pc[j].pts[5].x = 92.0;
        smGamut.pc[j].pts[5].y = 47.0;
        smGamut.pc[j].pts[6].x = 104.0;
        smGamut.pc[j].pts[6].y = 0.0;
    }
//
// find mapped point for point in bigGamut and
// not in smGamut
// hue = 0 for this exercise
//
// hard-coded cusp point for smGamut
// middle point of smGamut pieces
cuspPoint.x = 70.0;
cuspPoint.y = 0.0;
// arbitrary point, in-gamut of big, but
// out-of-gamut for small
samplePoint.x = 64.0;
samplePoint.y = 84.0;
    // create line segment from samplePoint to
    // cuspPoint
    sampleToCuspLine.A.x = samplePoint.x;
    sampleToCuspLine.A.y = samplePoint.y;
    sampleToCuspLine.B.x = cuspPoint.x;
    sampleToCuspLine.B.y = cuspPoint.y;
    // find intersection between sampleToCusp and
    // pieces
    point.x = 0.0;
    point.y = 0.0;
    for (i = 0; i < smGamut.pc[0].count - 1; i++)
    {
        currentPieceLine.A.x =
smGamut.pc[0].pts[i].x;
        currentPieceLine.A.y =
smGamut.pc[0].pts[i].y;
        currentPieceLine.B.x =
smGamut.pc[0].pts[i+1].x;
        currentPieceLine.B.y =
smGamut.pc[0].pts[i+1].y;
        if ( CheckIntersect(currentPieceLine,
sampleToCuspLine, &point) == DO_INTERSECT)
        {
            fprintf(stderr, "intersect at %.2lf,
%.2lf\n", point.x, point.y);
            break;
        }
    }
    while (1)
    {
    // refine piece line segment by searching along
    // both the x and y axes to find the gamut
    // boundary using the smGamut.
    //
    // NOTE: The ceil/floor mechanism assumes a
    // concave gamut boundary. Preferably, the
    // slope of the current piece could be used to
    // determine which side of the currentPiece the
    // gamut boundry lies. A positive slope would
    // indicate that the current piece is below the
    // cusp, a negative slope would indicate that it
    // was above the cusp.
        if ( cuspPoint.x > point.x )
        {
            i = (int)floor(point.x);
            while (i > 0)
            {
                if (ceil(point.y) > *MAP_INDEX(
smGamut, i, 0))
                {
                    currentPieceLine.A.x =
(double)i;
                    currentPieceLine.A.y =
*MAP_INDEX( smGamut, i, 0);
                    break;
                }
                i -= 1;
            }
            currentPieceLine.B.x = ceil(point.x);
            currentPieceLine.B.y = *MAP_INDEX(
smGamut, (int)ceil(point.x), 0);
            fprintf(stderr, "new piece: (%.2lf,
%.2lf), (%.2lf,%.2lf)\n",currentPieceLine.A.x,current
PieceLine.A.y,currentPieceLine.B.x,currentPieceLine.
B.y);
        }
        else
        {
            i = (int)ceil(point.x);
            while (i <
smGamut.pc[0].pts[smGamut.pc[0].count-1].x)
            {
                if (ceil(point.y) > *MAP_INDEX(
smGamut, i, 0))
                {
                    currentPieceLine.B.x =
(double)i;
                    currentPieceLine.B.y =
*MAP_INDEX( smGamut, i, 0);
```

APPENDIX-continued

```
                break;
            }
            i += 1;
        }
        currentPieceLine.A.x = floor(point.x);
        currentPieceLine.A.y = *MAP_INDEX(
smGamut, (int)floor(point.x), 0);
        fprintf(stderr,"new piece: (%.2lf,
%.2lf),(%.2lf,%.2lf)\n",currentPieceLine.A.x,current
PieceLine.A.y,currentPieceLine.B.x,currentPieceLine.
B.y);
    }
        if ( point.x == oldPoint.x && point.y ==
oldPoint.y)
        {
            fprintf(stderr, " Done!\n");
            break;
        }
        else if ( CheckIntersect(currentPieceLine,
sampleToCuspLine, &point) == DO_INTERSECT )
        {
            fprintf(stderr, "intersect at %.2lf,
%.2lf\n", point.x, point.y);
            oldPoint = point;
        }
        else
        {
            fprintf(stderr,"Bad
Intersection...\n");
            break;
        }
    }
return 0;
}
int CheckIntersect(Line line1, Line line2, Point
*point)
{
// from Graphic Gems II, Arvo, et. al.
// In the Public Domain
//
double a1, a2, b1, b2, c1, c2;
double r1, r2, r3, r4;
double denom, offset, num;
a1 = line1.B.y - line1.A.y;
b1 = line1.A.x - line1.B.x;
c1 = line1.B.x * line1.A.y - line1.A.x *
line1.B.y;
        r3 = a1 * line2.A.x + b1 * line2.A.y + c1;
        r4 = a1 * line2.B.x + b1 * line2.B.y + c1;
        if (r3 != 0.0 && r4 != 0.0 && CheckSigns(r3,
r4))
            return (DONT_INTERSECT);
        a2 = line2.B.y - line2.A.y;
        b2 = line2.A.x - line2.B.x;
        c2 = line2.B.x * line2.A.y - line2.A.x *
line2.B.y;
        r1 = a2 * line1.A.x + b2 * line1.A.y + c2;
        r2 = a2 * line1.B.x + b2 * line1.B.y + c2;
        if (r1 != 0 && r2 != 0 && CheckSigns(r1, r2))
            return (DONT_INTERSECT);
        denom = a1 * b2 - a2 * b1;
        if (denom == 0)
            return (COLINEAR);
        offset = denom < 0 ? -denom/2 : denom/2;
        num = b1 * c2 - b2 * c1;
        point->x = ( num < 0 ? num - offset : num +
offset) /denom;
        num = a2 * c1 - a1 * c2;
        point->y = ( num < 0 ? num - offset : num +
offset) /denom;
        return (DO_INTERSECT);
}
int CheckSigns( double a, double b )
{
    if ( a >= 0 && b >= 0 ) return (1);
    if ( a < 0 && b < 0 ) return (1);
    return (0);
}
int NewMapAllocate (GamutMap gamutmap)
```

APPENDIX-continued

```
{
    if (gamutmap.lightnessLevels <=0 ||
gamutmap.hueSlices <= 0)
        return (0);
    gamutmap.map = malloc (gamutmap.lightnessLevels
* gamutmap.hueSlices * sizeof(double));
    if (gamutmap.map == NULL) return (0);
    return(1);
}
```

What is claimed is:

1. A method for mapping an input point to a surface of a color gamut in a color space, comprising the steps of:

selecting a two-dimensional slice of the color space, the two-dimensional slice including the input point;

determining a projection for mapping the input point to the surface of the color gamut; and repeatedly estimating a point where the projection intersects the surface of the color gamut by repeatedly performing the steps of determining an approximation of the surface of the color gamut, and determining an intersection of the projection with the approximation, wherein after each estimation, the approximation is updated based on the intersection.

2. A method according to claim 1, wherein a first approximation of the surface of the color gamut extends between predetermined points at least substantially on the surface of the color gamut.

3. A method according to claim 2, wherein the predetermined points are stored in a table.

4. A method according to claim 3, wherein the table is indexed by hue value.

5. A method according to claim 1, wherein the point where the projection intersects the surface of the color gamut is repeatedly estimated until a goodness criteria is satisfied.

6. A method according to claim 5, wherein the goodness criteria is that the estimation of the point varies less than a predetermined small amount between successive estimations.

7. A method according to claim 5, wherein the goodness criteria is performance of a predetermined number of successive estimations.

8. A method according to claim 1, wherein the color space has hue, chroma, and lightness axes.

9. A method according to claim 8, wherein the two-dimensional slice is a slice of constant hue.

10. A method according to claim 8, wherein the surface of the color gamut is stored in a table indexed by hue and lightness values, the table containing chroma values corresponding to hue and lightness values.

11. A method according to claim 8, wherein the surface of the color gamut is stored in a table indexed by hue and chroma values, the table containing lightness values corresponding to hue and chroma values.

12. A method according to claim 8, wherein the projection extends between the input point and a point on the lightness axis having lightness at least substantially equal to lightness of a cusp of the surface of the color gamut in the two-dimensional slice.

13. A method according to claim 8, wherein in a second and each successive estimation of the point where the projection intersects the surface of the color gamut, the approximation extends between a first point and a second point, the first point and the second point at least substantially on the surface of the color gamut, the first point having chroma at least substantially equal to chroma of a previous intersection, and the second point having lightness at least substantially equal to lightness of the previous intersection.

14. A method according to claim 1, wherein the approximation is one or more straight-line segments extending between points at least substantially on the surface of the color gamut.

15. A method according to claim 1, wherein the approximation is one or more curves extending between points at least substantially on the surface of the color gamut.

16. A method for mapping an input point to a surface of a color gamut in a color space, comprising:
   a selecting step to select a two-dimensional slice of the color space, the two-dimensional slice including the input point;
   a first determining step to determine a projection point in the two-dimensional slice;
   a second determining step to determine a projection between the input point and the projection point;
   a third determining step to determine an intersection point between the projection and a mathematical approximation of the surface of the color gamut;
   a fourth determining step to determine a new mathematical approximation between points at least substantially on the surface of the color gamut, wherein the new mathematical approximation is determined based on the intersection point;
   a redetermining step to redetermine the intersection point, wherein the intersection point is redetermined at an intersection between the projection and the new mathematical approximation; and
   a repeating step to repeat the fourth determining step and the redetermining step until the intersection point satisfies a goodness criteria.

17. A method according to claim 16, wherein in the third determining step, the mathematical approximation extends between predetermined points at least substantially on the surface of the color gamut.

18. A method according to claim 17, wherein the predetermined points are stored in a table.

19. A method according to claim 18, wherein the table is indexed by hue value.

20. A method according to claim 16, wherein in the third determining step, the mathematical approximation is one or more straight-line segments extending between points at least substantially on the surface of the color gamut.

21. A method according to claim 16, wherein in the third determining step, the mathematical approximation is one or more curves extending between points at least substantially on the surface of the color gamut.

22. A method according to claim 16, wherein in the fourth determining step, the new mathematical approximation is a straight-line segment extending between points at least substantially on the surface of the color gamut.

23. A method according to claim 16, wherein in the fourth determining step, the new mathematical approximation is a curve extending between points at least substantially on the surface of the color gamut.

24. A method according to claim 16, wherein the goodness criteria is that the intersection point varies less than a predetermined small amount between successive repetitions of the fourth determining step and the redetermining step.

25. A method according to claim 16, wherein the goodness criteria is performance of a predetermined number of successive repetitions of the fourth determining step and the redetermining step.

26. A method according to claim 16, wherein the color space has hue, chroma, and lightness axes.

27. A method according to claim 26, wherein the two-dimensional slice is a slice of constant hue.

28. A method according to claim 26, wherein the surface of the color gamut is stored in a table indexed by hue and lightness values, the table containing chroma values corresponding to hue and lightness values.

29. A method according to claim 26, wherein the surface of the color gamut is stored in a table indexed by hue and chroma values, the table containing lightness values corresponding to hue and chroma values.

30. A method according to claim 26, wherein the projection point is a point on the lightness axis having lightness at least substantially equal to lightness of a cusp of the surface of the color gamut in the two-dimensional slice.

31. A method according to claim 26, wherein in the fourth determining step, a first one of the points for the new mathematical approximation has chroma at least substantially equal to chroma of the intersection point, and a second one of the points for the new mathematical approximation has lightness at least substantially equal to lightness of the intersection point.

32. An apparatus for mapping an input point to a surface of a color gamut in a color space, comprising:
   a memory including a region for storing executable process steps; and
   a processor for executing the executable process steps;
   wherein the executable process steps include the steps of:
   (a) selecting a two-dimensional slice of the color space, the two-dimensional slice including the input point; (b) determining a projection for mapping the input point to the surface of the color gamut; and (c) repeatedly estimating a point where the projection intersects the surface of the color gamut by repeatedly performing the steps of determining an approximation of the surface of the color gamut, and determining an intersection of the projection with the approximation, wherein after each estimation, the approximation is updated based on the intersection.

33. An apparatus according to claim 32, wherein a first approximation of the surface of the color gamut extends between predetermined points at least substantially on the surface of the color gamut.

34. An apparatus according to claim 33, wherein the predetermined points are stored in a table.

35. An apparatus according to claim 34, wherein the table is indexed by hue value.

36. An apparatus according to claim 32, wherein the approximation is one or more straight-line segments extending between points at least substantially on the surface of the color gamut.

37. An apparatus according to claim 32, wherein the approximation is one or more curves extending between points at least substantially on the surface of the color gamut.

38. An apparatus according to claim 32, wherein the point where the projection intersects the surface of the color gamut is repeatedly estimated until a goodness criteria is satisfied.

39. An apparatus according to claim 38, wherein the goodness criteria is that the estimation of the point varies less than a predetermined small amount between successive estimations.

40. An apparatus according to claim 38, wherein the goodness criteria is performance of a predetermined number of successive estimations.

41. An apparatus according to claim 32, wherein the color space has hue, chroma, and lightness axes.

42. An apparatus according to claim 41, wherein the two-dimensional slice is a slice of constant hue.

43. An apparatus according to claim 41, wherein the surface of the color gamut is stored in a table indexed by hue and lightness values, the table containing chroma values corresponding to hue and lightness values.

44. An apparatus according to claim 41, wherein the surface of the color gamut is stored in a table indexed by hue and chroma values, the table containing lightness values corresponding to hue and chroma values.

45. An apparatus according to claim 41, wherein the projection extends between the input point and a point on the lightness axis having lightness at least substantially equal to lightness of a cusp of the surface of the color gamut in the two-dimensional slice.

46. An apparatus according to claim 41, wherein in a second and each successive estimation of the point where the projection intersects the surface of the color gamut, the approximation extends between a first point and a second point, the first point and the second point at least substantially on the surface of the color gamut, the first point having chroma at least substantially equal to chroma of a previous intersection, and the second point having lightness at least substantially equal to lightness of the previous intersection.

47. An apparatus for mapping an input point to a surface of a color gamut in a color space, comprising:
a memory for storing executable process steps; and
a processor for executing the executable process steps;
wherein the executable process steps include: (a) a selecting step to select a two-dimensional slice of the color space, the two-dimensional slice including the input point; (b) a first determining step to determine a projection point in the two-dimensional slice; (c) a second determining step to determine a projection between the input point and the projection point; (d) a third determining step to determine an intersection point between the projection and a mathematical approximation of the surface of the color gamut; (e) a fourth determining step to determine a new mathematical approximation between points at least substantially on the surface of the color gamut, wherein the new mathematical approximation is determined based on the intersection point; (f) a redetermining step to redetermine the intersection point, wherein the intersection point is redetermined at an intersection between the projection and the new mathematical approximation; and (g) a repeating step to repeat the fourth determining step and the redetermining step until the intersection point satisfies a goodness criteria.

48. An apparatus according to claim 47, wherein in the third determining step, the mathematical approximation extends between predetermined points at least substantially on the surface of the color gamut.

49. An apparatus according to claim 48, wherein the predetermined points are stored in a table.

50. An apparatus according to claim 49, wherein the table is indexed by hue value.

51. An apparatus according to claim 47, wherein in the third determining step, the mathematical approximation is one or more straight-line segments extending between points at least substantially on the surface of the color gamut.

52. An apparatus according to claim 47, wherein in the third determining step, the mathematical approximation is one or more curves extending between points at least substantially on the surface of the color gamut.

53. An apparatus according to claim 47, wherein in the fourth determining step, the new mathematical approximation is a straight-line segment extending between points at least substantially on the surface of the color gamut.

54. An apparatus according to claim 47, wherein in the fourth determining step, the new mathematical approximation is a curve extending between points at least substantially on the surface of the color gamut.

55. An apparatus according to claim 47, wherein the goodness criteria is that the intersection point varies less than a predetermined small amount between successive repetitions of the fourth determining step and the redetermining step.

56. An apparatus according to claim 47, wherein the goodness criteria is performance of a predetermined number of successive repetitions of the fourth determining step and the redetermining step.

57. An apparatus according to claim 47, wherein the color space has hue, chroma, and lightness axes.

58. An apparatus according to claim 57, wherein the two-dimensional slice is a slice of constant hue.

59. An apparatus according to claim 57, wherein the surface of the color gamut is stored in a table indexed by hue and lightness values, the table containing chroma values corresponding to hue and lightness values.

60. An apparatus according to claim 57, wherein the surface of the color gamut is stored in a table indexed by hue and chroma values, the table containing lightness values corresponding to hue and chroma values.

61. An apparatus according to claim 57, wherein the projection point is a point on the lightness axis having lightness at least substantially equal to lightness of a cusp of the surface of the color gamut in the two-dimensional slice.

62. An apparatus according to claim 57, wherein in the fourth determining step, a first one of the points for the new mathematical approximation has chroma at least substantially equal to chroma of the intersection point, and a second one of the points for the new mathematical approximation has lightness at least substantially equal to lightness of the intersection point.

63. Computer-executable process steps stored on a computer-readable medium, the computer executable process steps for mapping an input point to a surface of a color gamut in a color space, the computer-executable process steps comprising:
code to select a two-dimensional slice of the color space, the two-dimensional slice including the input point;
code to determine a projection for mapping the input point to the surface of the color gamut; and
code to estimate repeatedly a point where the projection intersects the surface of the color gamut by repeatedly performing the steps of determining an approximation of the surface of the color gamut, and determining an intersection of the projection with the approximation, wherein after each estimation, the approximation is updated based on the intersection.

64. Computer-executable process steps according to claim 63, wherein a first approximation of the surface of the color gamut extends between predetermined points at least substantially on the surface of the color gamut.

65. Computer-executable process steps according to claim 64, wherein the predetermined points are stored in a table.

66. Computer-executable process steps according to claim 65, wherein the table is indexed by hue value.

67. Computer-executable process steps according to claim 63, wherein the approximation is one or more straight-line segments extending between points at least substantially on the surface of the color gamut.

68. Computer-executable process steps according to claim 63, wherein the approximation is one or more curves extending between points at least substantially on the surface of the color gamut.

69. Computer-executable process steps according to claim 63, wherein the point where the projection intersects the surface of the color gamut is repeatedly estimated until a goodness criteria is satisfied.

70. Computer-executable process steps according to claim 69, wherein the goodness criteria is that the estimation of the point varies less than a predetermined small amount between successive estimations.

71. Computer-executable process steps according to claim 69, wherein the goodness criteria is performance of a predetermined number of successive estimations.

72. Computer-executable process steps according to claim 63, wherein the color space has hue, chroma, and lightness axes.

73. Computer-executable process steps according to claim 72, wherein the two-dimensional slice is a slice of constant hue.

74. Computer-executable process steps according to claim 72, wherein the surface of the color gamut is stored in a table indexed by hue and lightness values, the table containing chroma values corresponding to hue and lightness values.

75. Computer-executable process steps according to claim 72, wherein the surface of the color gamut is stored in a table indexed by hue and chroma values, the table containing lightness values corresponding to hue and chroma values.

76. Computer-executable process steps according to claim 72, wherein the projection extends between the input point and a point on the lightness axis having lightness at least substantially equal to lightness of a cusp of the surface of the color gamut in the two-dimensional slice.

77. Computer-executable process steps according to claim 72, wherein in a second and each successive estimation of the point where the projection intersects the surface of the color gamut, the approximation extends between a first point and a second point, the first point and the second point at least substantially on the surface of the color gamut, the first point having chroma at least substantially equal to chroma of a previous intersection, and the second point having lightness at least substantially equal to lightness of the previous intersection.

78. Computer-executable process steps for mapping an input point to a surface of a color gamut in a color space, comprising:

selecting code to select a two-dimensional slice of the color space, the two-dimensional slice including the input point;

first determining code to determine a projection point in the two-dimensional slice;

second determining code to determine a projection between the input point and the projection point;

third determining code to determine an intersection point between the projection and a mathematical approximation of the surface of the color gamut;

fourth determining code to determine a new mathematical approximation between points at least substantially on the surface of the color gamut, wherein the new mathematical approximation is determined based on the intersection point;

redetermining code to redetermine the intersection point, wherein the intersection point is redetermined at an intersection between the projection and the new mathematical approximation; and repeating code to repeat execution of the fourth determining code and the redetermining code until the intersection point satisfies a goodness criteria.

79. Computer-executable process steps according to claim 78, wherein the mathematical approximation determined by the third determining code extends between predetermined points at least substantially on the surface of the color gamut.

80. Computer-executable process steps according to claim 79, wherein the predetermined points are stored in a table.

81. Computer-executable process steps according to claim 80, wherein the table is indexed by hue value.

82. Computer-executable process steps according to claim 78, wherein the mathematical approximation determined by the third determining code is one or more straight-line segments extending between points at least substantially on the surface of the color gamut.

83. Computer-executable process steps according to claim 78, wherein the mathematical approximation determined by the third determining code is one or more curves extending between points at least substantially on the surface of the color gamut.

84. Computer-executable process steps according to claim 78, wherein the new mathematical approximation determined by the fourth determining code is a straight-line segment extending between points at least substantially on the surface of the color gamut.

85. Computer-executable process steps according to claim 78, wherein the new mathematical approximation determined by the fourth determining code is a curve extending between points at least substantially on the surface of the color gamut.

86. Computer-executable process steps according to claim 78, wherein the goodness criteria is that the intersection point varies less than a predetermined small amount between successive repetitions of the fourth determining step and the redetermining step.

87. Computer-executable process steps according to claim 78, wherein the goodness criteria is performance of a predetermined number of successive repetitions of the fourth determining step and the redetermining step.

88. Computer-executable process steps according to claim 78, wherein the color space has hue, chroma, and lightness axes.

89. Computer-executable process steps according to claim 88, wherein the two-dimensional slice is a slice of constant hue.

90. Computer-executable process steps according to claim 88, wherein the surface of the color gamut is stored in a table indexed by hue and lightness values, the table containing chroma values corresponding to hue and lightness values.

91. Computer-executable process steps according to claim 88, wherein the surface of the color gamut is stored in a table indexed by hue and chroma values, the table containing lightness values corresponding to hue and chroma values.

92. Computer-executable process steps according to claim 88, wherein the projection point is a point on the lightness axis having lightness at least substantially equal to lightness of a cusp of the surface of the color gamut in the two-dimensional slice.

93. Computer-executable process steps according to claim 88, wherein a first one of the points determined by the fourth determining code for the new mathematical approximation has chroma at least substantially equal to chroma of the intersection point, and a second one of the points determined by the fourth determining code for the new mathematical approximation has lightness at least substantially equal to lightness of the intersection point.

94. A computer-readable medium which stores computer-executable process steps, the computer-executable process steps for mapping an input point to a surface of a color gamut in a color space, the computer-executable process steps comprising:

a selecting step to select a two-dimensional slice of the color space, the two-dimensional slice including the input point;

a determining step to determine a projection for mapping the input point to the surface of the color gamut; and a repeated estimating step to estimate repeatedly a point where the projection intersects the surface of the color gamut by repeatedly performing the steps of determining an approximation of the surface of the color gamut, and determining an intersection of the projection with the approximation, wherein after each estimation, the approximation is updated based on the intersection.

95. A computer-readable medium according to claim 94, wherein a first approximation of the surface of the color gamut extends between predetermined points at least substantially on the surface of the color gamut.

96. A computer-readable medium according to claim 95, wherein the predetermined points are stored in a table.

97. A computer-readable medium according to claim 96, wherein the table is indexed by hue value.

98. A computer-readable medium according to claim 94, wherein the approximation is one or more straight-line segments extending between points at least substantially on the surface of the color gamut.

99. A computer-readable medium according to claim 94, wherein the approximation is one or more curves extending between points at least substantially on the surface of the color gamut.

100. A computer-readable medium according to claim 94, wherein the point where the projection intersects the surface of the color gamut is repeatedly estimated until a goodness criteria is satisfied.

101. A computer-readable medium according to claim 100, wherein the goodness criteria is that the estimation of the point varies less than a predetermined small amount between successive estimations.

102. A computer-readable medium according to claim 100, wherein the goodness criteria is performance of a predetermined number of successive estimations.

103. A computer-readable medium according to claim 94, wherein the color space has hue, chroma, and lightness axes.

104. A computer-readable medium according to claim 103, wherein the two-dimensional slice is a slice of constant hue.

105. A computer-readable medium according to claim 103, wherein the surface of the color gamut is stored in a table indexed by hue and lightness values, the table containing chroma values corresponding to hue and lightness values.

106. A computer-readable medium according to claim 103, wherein the surface of the color gamut is stored in a table indexed by hue and chroma values, the table containing lightness values corresponding to hue and chroma values.

107. A computer-readable medium according to claim 103, wherein the projection extends between the input point and a point on the lightness axis having lightness at least substantially equal to lightness of a cusp of the surface of the color gamut in the two-dimensional slice.

108. A computer-readable medium according to claim 103, wherein in a second and each successive estimation of the point where the projection intersects the surface of the color gamut, the approximation extends between a first point and a second point, the first point and the second point at least substantially on the surface of the color gamut, the first point having chroma at least substantially equal to chroma of a previous intersection, and the second point having lightness at least substantially equal to lightness of the previous intersection.

109. A computer-readable medium which stores computer-executable process steps, the computer executable process steps for mapping an input point to a surface of a color gamut in a color space, the computer-executable process steps comprising:

a selecting step to select a two-dimensional slice of the color space, the two-dimensional slice including the input point;

a first determining step to determine a projection point in the two-dimensional slice;

a second determining step to determine a projection between the input point and the projection point;

a third determining step to determine an intersection point between the projection and a mathematical approximation of the surface of the color gamut;

a fourth determining step to determine a new mathematical approximation between points at least substantially on the surface of the color gamut, wherein the new mathematical approximation is determined based on the intersection point;

a redetermining step to redetermine the intersection point, wherein the intersection point is redetermined at an intersection between the projection and the new mathematical approximation; and a repeating step to repeat the fourth determining step and the redetermining step until the intersection point satisfies a goodness criteria.

110. A computer-readable medium according to claim 109, wherein in the third determining step, the mathematical approximation extends between predetermined points at least substantially on the surface of the color gamut.

111. A computer-readable medium according to claim 110, wherein the predetermined points are stored in a table.

112. A computer-readable medium according to claim 111, wherein the table is indexed by hue value.

113. A computer-readable medium according to claim 109, wherein in the third determining step, the mathematical approximation is one or more straight-line segments extending between points at least substantially on the surface of the color gamut.

114. A computer-readable medium according to claim 109, wherein in the third determining step, the mathematical approximation is one or more curves extending between points at least substantially on the surface of the color gamut.

115. A computer-readable medium according to claim 109, wherein in the fourth determining step, the new mathematical approximation is a straight-line segment extending between points at least substantially on the surface of the color gamut.

116. A computer-readable medium according to claim 109, wherein in the fourth determining step, the new mathematical approximation is a curve extending between points at least substantially on the surface of the color gamut.

117. A computer-readable medium according to claim 109, wherein the goodness criteria is that the intersection point varies less than a predetermined small amount between successive repetitions of the fourth determining step and the redetermining step.

118. A computer-readable medium according to claim 109, wherein the goodness criteria is performance of a predetermined number of successive repetitions of the fourth determining step and the redetermining step.

119. A computer-readable medium according to claim 109, wherein the color space has hue, chroma, and lightness axes.

120. A computer-readable medium according to claim 119, wherein the two-dimensional slice is a slice of constant hue.

121. A computer-readable medium according to claim 119, wherein the surface of the color gamut is stored in a table indexed by hue and lightness values, the table containing chroma values corresponding to hue and lightness values.

122. A computer-readable medium according to claim 119, wherein the surface of the color gamut is stored in a table indexed by hue and chroma values, the table containing lightness values corresponding to hue and chroma values.

123. A computer-readable medium according to claim 119, wherein the projection point is a point on the lightness axis having lightness at least substantially equal to lightness of a cusp of the surface of the color gamut in the two-dimensional slice.

124. A computer-readable medium according to claim 119, wherein in the fourth determining step, a first one of the points for the new mathematical approximation has chroma at least substantially equal to chroma of the intersection point, and a second one of the points for the new mathematical approximation has lightness at least substantially equal to lightness of the intersection point.

125. An apparatus for mapping an input point to a surface of a color gamut in a color space, comprising:
   selecting means to select a two-dimensional slice of the color space, the two-dimensional slice including the input point;
   determining means to determine a projection for mapping the input point to the surface of the color gamut; and
   estimating means to estimate repeatedly a point where the projection intersects the surface of the color gamut by repeatedly performing the steps of determining an approximation of the surface of the color gamut, and determining an intersection of the projection with the approximation, wherein after each estimation, the approximation is updated based on the intersection.

126. An apparatus according to claim 125, wherein a first approximation of the surface of the color gamut extends between predetermined points at least substantially on the surface of the color gamut.

127. An apparatus according to claim 126, wherein the predetermined points are stored in a table.

128. An apparatus according to claim 127, wherein the table is indexed by hue value.

129. An apparatus according to claim 125, wherein the approximation is one or more straight-line segments extending between points at least substantially on the surface of the color gamut.

130. An apparatus according to claim 125, wherein the approximation is one or more curves extending between points at least substantially on the surface of the color gamut.

131. An apparatus according to claim 125, wherein the point where the projection intersects the surface of the color gamut is repeatedly estimated until a goodness criteria is satisfied.

132. An apparatus according to claim 131, wherein the goodness criteria is that the estimation of the point varies less than a predetermined small amount between successive estimations.

133. An apparatus according to claim 131, wherein the goodness criteria is performance of a predetermined number of successive estimations.

134. An apparatus according to claim 125, wherein the color space has hue, chroma, and lightness axes.

135. An apparatus according to claim 134, wherein the two-dimensional slice is a slice of constant hue.

136. An apparatus according to claim 134, wherein the surface of the color gamut is stored in a table indexed by hue and lightness values, the table containing chroma values corresponding to hue and lightness values.

137. An apparatus according to claim 134, wherein the surface of the color gamut is stored in a table indexed by hue and chroma values, the table containing lightness values corresponding to hue and chroma values.

138. An apparatus according to claim 134, wherein the projection extends between the input point and a point on the lightness axis having lightness at least substantially equal to lightness of a cusp of the surface of the color gamut in the two-dimensional slice.

139. An apparatus according to claim 134, wherein in a second and each successive estimation of the point where the projection intersects the surface of the color gamut, the approximation extends between a first point and a second point, the first point and the second point at least substantially on the surface of the color gamut, the first point having chroma at least substantially equal to chroma of a previous intersection, and the second point having lightness at least substantially equal to lightness of the previous intersection.

140. An apparatus for mapping an input point to a surface of a color gamut in a color space, comprising:
   selecting means to select a two-dimensional slice of the color space, the two-dimensional slice including the input point;
   first determining means to determine a projection point in the two-dimensional slice;
   second determining means to determine a projection between the input point and the projection point;
   third determining means to determine an intersection point between the projection and a mathematical approximation of the surface of the color gamut;
   fourth determining means to determine a new mathematical approximation between points at least substantially on the surface of the color gamut, wherein the new mathematical approximation is determined based on the intersection point;
   redetermining means to redetermine the intersection point, wherein the intersection point is redetermined at an intersection between the projection and the new mathematical approximation; and
   repeating means to cause the fourth determining means and the redetermining means to repeat their respective operations until the intersection point satisfies a goodness criteria.

141. An apparatus according to claim 140, wherein the mathematical approximation determined by the third determining means extends between predetermined points at least substantially on the surface of the color gamut.

142. An apparatus according to claim 141, wherein the predetermined points are stored in a table.

143. An apparatus according to claim 142, wherein the table is indexed by hue value.

144. An apparatus according to claim 140, wherein the mathematical approximation determined by the third determining means is one or more straight-line segments extending between points at least substantially on the surface of the color gamut.

145. An apparatus according to claim 140, wherein the mathematical approximation determined by the third determining means is one or more curves extending between points at least substantially on the surface of the color gamut.

146. An apparatus according to claim 140, wherein the new mathematical approximation determined by the fourth determining means is a straight-line segment extending between points at least substantially on the surface of the color gamut.

147. An apparatus according to claim 140, wherein the new mathematical approximation determined by the fourth determining means is a curve extending between points at least substantially on the surface of the color gamut.

148. An apparatus according to claim 140, wherein the goodness criteria is that the intersection point varies less than a predetermined small amount between successive repetitions of the fourth determining step and the redetermining step.

149. An apparatus according to claim 140, wherein the goodness criteria is performance of a predetermined number of successive repetitions of the fourth determining step and the redetermining step.

150. An apparatus according to claim 140, wherein the color space has hue, chroma, and lightness axes.

151. An apparatus according to claim 150, wherein the two-dimensional slice is a slice of constant hue.

152. An apparatus according to claim 150, wherein the surface of the color gamut is stored in a table indexed by hue and lightness values, the table containing chroma values corresponding to hue and lightness values.

153. An apparatus according to claim 150, wherein the surface of the color gamut is stored in a table indexed by hue and chroma values, the table containing lightness values corresponding to hue and chroma values.

154. An apparatus according to claim 150, wherein the projection point is a point on the lightness axis having lightness at least substantially equal to lightness of a cusp of the surface of the color gamut in the two-dimensional slice.

155. An apparatus according to claim 150, wherein a first one of the points determined by the fourth determining means for the new mathematical approximation has chroma at least substantially equal to chroma of the intersection point, and a second one of the points determined by the fourth determining means for the new mathematical approximation has lightness at least substantially equal to lightness of the intersection point.

\* \* \* \* \*